May 14, 1957   W. E. TOMLINSON ET AL   2,792,207
PORTABLE GRAIN DRYER
Filed July 16, 1953   2 Sheets-Sheet 1
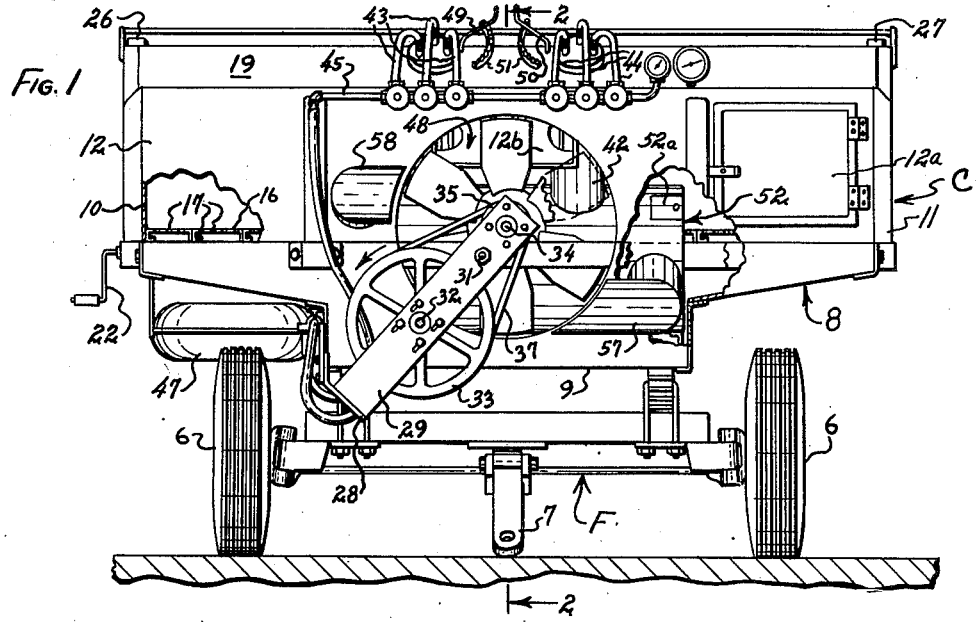
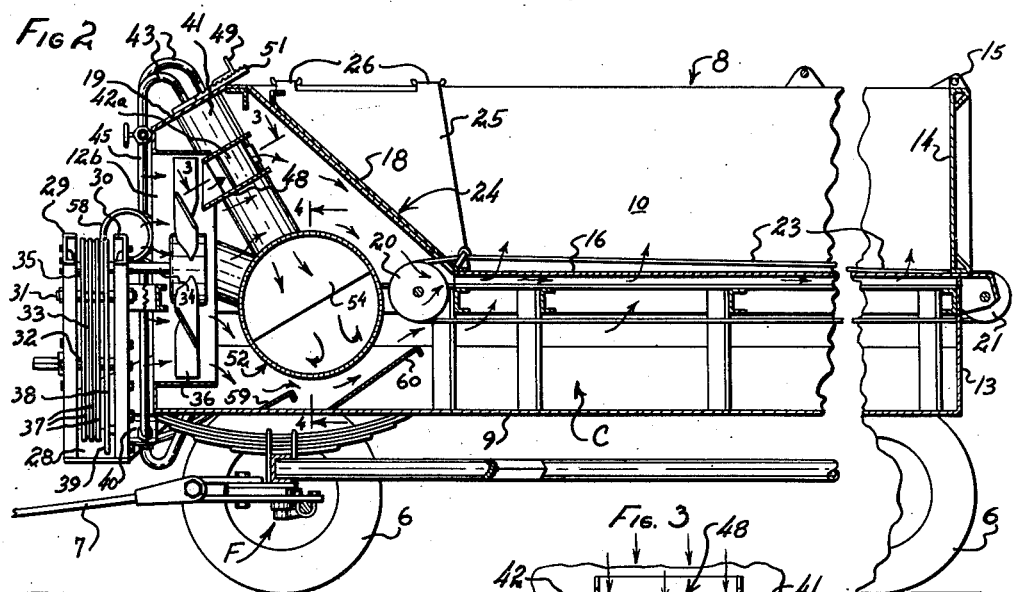
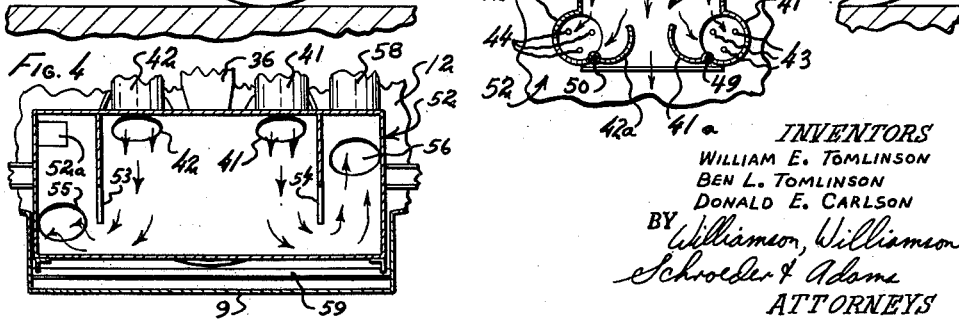
INVENTORS
WILLIAM E. TOMLINSON
BEN L. TOMLINSON
DONALD E. CARLSON
BY Williamson, Williamson,
Schroeder & Adams
ATTORNEYS

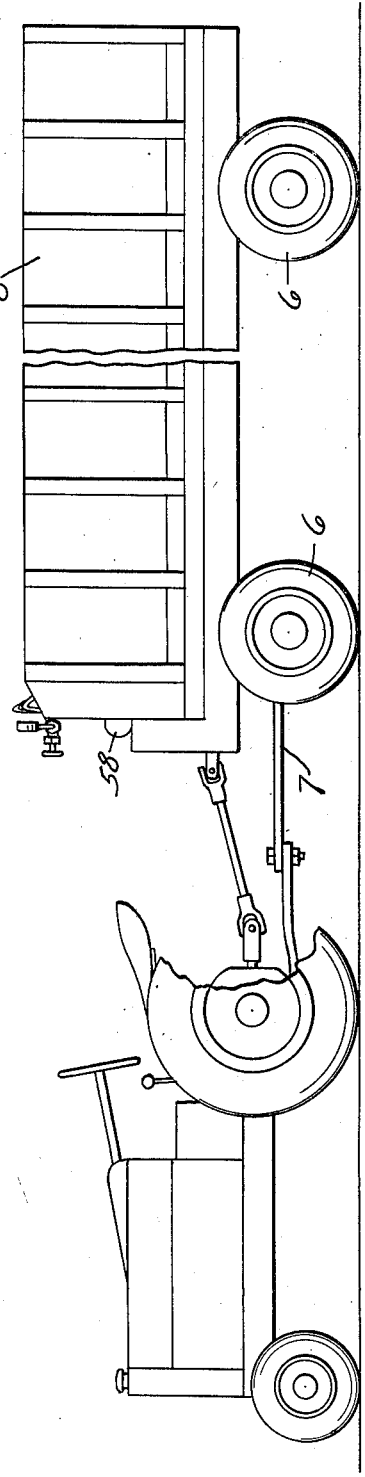

United States Patent Office 2,792,207
Patented May 14, 1957

2,792,207

PORTABLE GRAIN DRYER

William E. Tomlinson, Litchfield, Ben L. Tomlinson, Minneapolis, and Donald E. Carlson, Litchfield, Minn., assignors to Lakeshore Manufacturing Company, Minneapolis, Minn., a corporation of Minnesota Application July 16, 1953, Serial No. 368,378

11 Claims. (Cl. 263—8)

This invention relates to grain dryers. More particularly, it relates to grain dryers of the type adapted to be drawn through the field in conjunction with a harvesting machine and receive a harvested crop immediately therein for simultaneous drying while the remainder of the crop is being harvested.

A number of portable grain dryers have been designed previously and placed upon the market but none of them have proved practical and commercially feasible. One of the many problems encountered in such devices has been the adverse effect of the static pressure which is generated as a result of attempting to force the warm air upwardly through the moist harvested crop. The burner of such a dryer has always been subjected to the adverse effect of this static pressure with the result that the burner has not functioned as economically and as properly as it should. Another problem which has never been satisfactorily solved has been the tendency of the air within the burner to stratify and not mix thoroughly so that the drying operation has been non-uniform throughout the various portions of the dryer. Our invention is directed toward eliminating these problems and providing an economical and commercially feasible dryer of a size and type that every farmer owning a farm of any substantial size could afford to own and operate one.

It is a general object of our invention to provide a novel and improved portable grain dryer of relatively cheap and simple construction.

A more specific object is to provide a novel and improved portable grain dryer which is commercially feasible and practical in operation.

Another object is to provide a portable grain dryer which will permit the user to harvest his crop immediately upon its maturity regardless of weather conditions.

Another object is to provide a portable grain dryer which will permit the user to resume harvesting operations much sooner than would otherwise be possible in the event the harvest is interrupted by rain.

Another object is to provide a novel and improved grain dryer constructed to permit the user to harvest immature crops in the event of an abnormally cold or short growing season and an early frost without danger of spoilage of the same between the actual harvesting operation and subsequent drying.

Another object is to provide a portable grain dryer which will permit the user to reduce the moisture of his crops immediately upon their harvest to the proper percentage for proper storage or highest market grades regardless of weather conditions.

Another object is to provide a novel and improved portable grain dryer constructed to eliminate the static pressure problem encountered in dryers previously known.

Another object is to provide a portable grain dryer which will provide better mixing of the hot combustion gases and the cool air which is introduced into the heating chamber and which will eliminate air stratification tendencies encountered in dryers previously known.

Another object is to provide a portable grain dryer constructed to function with maximum efficiency and to make maximum utilization of the heat generated therein.

Another object is to provide a novel and improved grain dryer constructed to introduce prewarmed oxygen-laden air into the burners of the dryer to obtain maximum combustion of the fuel used in producing the heat for the drying operation.

These and other objects and advantages of our invention will more fully appear from the following description made in connection with the accompanying drawings, wherein like reference characters refer to the same or similar parts throughout the several views, and in which:

Fig. 1 is a front end elevational view of one embodiment of our invention with portions thereof broken away to show the interior of the machine;

Fig. 2 is a longitudinal sectional view of the machine;

Fig. 3 is a sectional view taken along line 3—3 of Fig. 2;

Fig. 4 is a vertical sectional view taken along line 4—4 of Fig. 2; and

Fig. 5 is a side elevational view with parts broken away showing the machine being drawn by a tractor and connected to the power take-off thereof.

One embodiment of our invention may include, as shown in Figs. 1–4, a frame indicated generally as F and made ambulant by a pair of front and rear wheels indicated generally as 6. This frame is adapted to be connected to the rear end of a tractor (not shown) by its tongue 7. A wagon box or container indicated generally as 8 has an imperforate bottom 9, a pair of opposed imperforate side walls 10 and 11, and a front wall 12 having a door 12a formed therein and having a fairly large opening 12b also formed therein but centrally thereof. The wagon box has a rear wall 13, a portion of which is comprised of an end gate 14 pivotable at its upper edge as at 15.

Extending horizontally in spaced elevation relative to the bottom wall 9 is a false bottom 16 provided with a plurality of perforations 17 therein. These perforations extend throughout the length of the false bottom 16 and are uniformly distributed. An imperforate panel 18 extends upwardly and forwardly from the forward end of the false bottom 16 and is joined with the front wall 12 by an inclined panel 19. This false bottom 16 forms in conjunction with the bottom wall 9, the end walls 12 and 13 and the side walls 10 and 11, a heating chamber indicated generally as C.

Pivotally mounted upon the wagon box or container 8 is a pair of sprockets or rollers 20 and 21, the forward one 20 of which has a removable crank 22 attached to it to permit manual rotation of the sprocket 20 about its longitudinal axis. Cables 23 at each side of the container 8 extend around these rollers or sprockets 20 and 21 and are attached to a scraper or scoop indicated generally as 24 which is normally positioned at the forward part of the container and abutting against the panel 18 as best shown in Fig. 2. This scraper or scoop 24 is comprised of a pair of generally triangularly shaped side plates such as the plate 25 and each of these plates 25 has an outwardly extending guide 26 or 27 secured thereto and engaging the top edge of the side walls 10 and 11 to act as a guide or follower for the scraper or scoop.

Extending downwardly from the forward end of the frame F is a support plate 28 and welded to this support plate 28 by their lower ends is a pair of channel members 29 and 30. These channel members 29 and 30 are secured to the frame F by their upper portions by a bolt 31 and are spaced relative to each other, as best shown in Fig. 2. Journaled in these channel members 29 and 30 is a drive shaft 32 which is adapted at its forward end as at 33 to be connected to the power-take-off of a tractor (not shown). Carried by this drive shaft 32 is a pulley 33. Journaled in the upper end portion of the channel members 29 and 30 is a shaft 34 which carries a pulley 35 on one of its end portions and a fan 36 on its more rearward end portions. This fan 36 is mounted to draw air inwardly and force it rearwardly into the heating chamber C beneath the false bottom 23. A set of three V-belts indicated as 37 extends around the pulley 35 and the pulley 33. A fourth V-belt 38 extends around the pulley 35 and downwardly around another pulley 39 which drives the fuel pump 40.

Mounted on the panel 19 and extending inwardly and downwardly therefrom is a pair of blast-type burners 41 and 42. Each of these burners has a set of three branch fuel supply lines indicated as 43 and 44 which emanate from a main fuel supply line 45 which in turn is connected to a filter 46. This filter 46 is connected to the fuel pump 40 by a fuel line which in turn is connected to the fuel supply tank 47.

Positioned between the burners 41 and 42 inwardly of the opening 12b and in front of the discharge side of the fan 36, is an air chute or scoop indicated generally as 48. This air chute discharges normally into the heating chamber C. Each of the burners 41 and 42, however, has a section thereof 41a and 42a which is swingable into the interior of the chute 48 and toward each other as best shown in Fig. 3. These portions 41a and 42a are in effect dampers provided to scoop the air driven by the fan into the interior of their respective burners. Each of these dampers 41a and 42a is connected to a damper rod 49 or 50 as the case may be. Each of these rods extends upwardly through the panel 19 and is bent into a handle shape as best shown in Fig. 1, where they pass over retaining means indicated generally as 51. By means of these handle portions the rods 49 and 50 can be adjusted as desired so as to cause the dampers 41a and 42a to pivot toward open or closed position as desired.

The lower ends of the burners 41 and 42 extend downwardly into the top portions of a cylindrically shaped furnace indicated generally as 52. This furnace 52 extends transversely relative to the length of the container 8 and the heating chamber C and is mounted in elevated position relative to the bottom wall 9. A pair of baffles 53 and 54 extend downwardly from the upper portion of the wall of the furnace to a position midway between the top and bottom of the furnace. As can best be seen in Fig. 4, these baffles 53 and 54 are positioned just outside the two burners 41 and 42 and between these burners and a pair of discharge outlets 55 and 56. As best shown in Fig. 4, the outlet 56 is formed in the upper portion of the wall of the furnace and the discharge 55 is formed in the lower portions thereof. A small door 52a is provided in the upper portion of the furnace 52 as shown in Fig. 1 to facilitate lighting of the burners. Connected to the furnace 52 at these discharge openings 55 and 56 is a pair of hot air conduits 57 and 58, the latter of which terminates adjacent the upper portion of the fan 36 and outside the container 8. As can best be seen in Fig. 1, this conduit 58 discharges into the intake side of the fan 36 at a level just below the level of the air chute or scoop 48. The other conduit 57 terminates adjacent the lower portion of the fan 36 and outside the container 8 so that the air and products of combustion discharged thereby is forced outwardly at the intake side of the fan 36.

Secured to the bottom wall 9 and extending upwardly and rearwardly therefrom below the furnace 52 is a small baffle 59 and a larger baffle 60. The positioning and dimensions of these baffles can best be seen in Fig. 2. They extend transversely of the heating chamber C and across the width thereof to guide the air upwardly around the furnace so as to maintain it in as close contact therewith as possible.

In use, the entire unit as shown is connected to the rear end of a tractor by means of the tongue 7 and the shaft 32 is connected directly to the power-take-off of the tractor by means of a shaft having a universal joint therein. Thus the power-take-off of the tractor drives the fuel pump 40 and the blower 36 directly. The pulley 33 is large relative to the pulley 35 in order to speed up the R. P. M.'s of the fan 36. The discharge of the harvesting machine is arranged so as to discharge the harvested grain into the interior of the container 8 and upon the upper surface of the false bottom 16 so that the hot air and combustion gases may be driven upwardly therethrough to effectively dry the same. While the harvesting operation continues, the heated moving air effects the drying of the harvested crop and reduces the moisture content thereof to the desired percentage.

In order to commence with the operation of the drying unit shown, the door 12a is opened and a torch is inserted therethrough and through the lighting door 52a into the interior of the furnace to light the burner 41. Lighting of the burner 41 will cause the burner 42 also to to be immediately lighted. The fuel pump 40 withdraws the fuel from the fuel tank 47 and forces it through the main supply line 45 and the branch supply lines 43 and 44 so that the spray nozzles (not shown) of the burners 41, 42 will discharge the fuel oil in a fine spray longitudinally of the burner from a point about one-half the length thereof from the panel 19 to the lower end of the burner. The fan 36, which will be driven by the V-belts 37 at a very rapid rate, will force air rapidly into the interior of the drying chamber C. A portion of this air, which will have an ample supply of oxygen therein, is scooped up by the dampers 41a and 42a within the air chute 48 and forced into the interior of the burners 41 and 42 to mix with the sprayed fuel and to support the combustion thereof in a more efficient manner. Thus the hot combustion gases are forcefully driven into the interior of the furnace 52 and downwardly below the baffles 54 and 53 as indicated by the arrows in Fig. 4 and outwardly through the discharge openings 55 and 56 of the furnace 52. These hot combustion gases are carried outwardly of the chamber 8 through the hot air conduits 57 and 58 and discharged, as best shown in Figs. 1 and 2, at the intake side of the fan 36. The fan 36 draws these hot gases rapidly inwardly into the interior of the drying chamber C and mixes them with an additional supply of cool air which is drawn from the exterior so as to prevent the temperature of the air to which the crop to be dried is subjected from being too extreme. It will be noted that the hot combustion gases are driven across the exterior of the furnace 52 and rearwardly below the false bottom 16 and upwardly through the apertures 17 thereof to permeate the crop and forcefully dry the same. Because the air is flowing upwardly it tends to lift the crop and maintain it in as loose a condition as possible.

It will be noted that the air chute or scoop 48 is positioned above the discharge level of each of the hot air conduits 57 and 58. This prevents the chute 48 from taking in only hot combustion gases and insures that each of the burners 41 and 42 will be supplied with an ample supply of oxygen-laden air. At the same time, this oxygen laden air will be warmed to a certain extent by some of the combustion gases mixed therein and thus the resulting combustion which takes place within the burner is more efficient than would be attained if the air were not pre-warmed.

By discharging the hot combustion gases at the intake of the fan 36, we have insured that the hot combustion gases will mix uniformly with the cool air drawn and forced into the heating chamber C. Thus we are assured that the stratification which accompanies the operation of most grain dryers will not take place during the operation of our grain dryer. To the contrary, the air is uniformly mixed. It will also be noted that the air is driven around the furnace 52 so as to absorb additional heat therefrom as it passes inwardly into the heating chamber C. It can be readily seen that there is substantially no loss of heat because of this unique arrangement and the efficiency of the unit is thereby substantially increased.

Thus it can be seen that we have provided a novel and improved portable grain dryer which has distinct advantages over those previously designed for this purpose. One particular advantage of our grain dryer is that we have eliminated the adverse effects of static pressure on the burners. There is no back pressure against the burner as a result of the pressures which were built up within the heating chamber C as is the usual case in grain dryers of this type. In other words, there is no back pressure to hinder the efficient operation of the burners 41 and 42 and to prevent complete combustion of the fuel oil which is discharged by the burner.

If it is desired, only one of the burners need be operated, and in that case the damper of the other burner would be moved to closed position so that the air forced inwardly by the fan into the chute 48 would move past the inoperative burner and into the heating chamber C. The dampers of the remaining burner would remain open to scoop air into the interior of its burner and support the combustion therein.

It will be noted that our grain dryer is an unusually compact unit and in fact is self-contained as a wagon box and heating unit. It permits the harvesting, drying and storing operations to be a single continuous operation without interruptions. In this connection it may be noted that a canvas cover (not shown) may be provided to cover the harvested crop in the event of rain.

When the harvested crop has been sufficiently dried, the crank 22 may be operated to cause the scoop 24 to move rearwardly and scrape the dried harvested crop outwardly through the rear end gate 14 into storage facilities or into a vehicle adapted to move the dried crop to a place of storage. If the particular crop is in such a moist condition that it cannot be dried as rapidly as harvested, it is a simple matter to utilize two of such units so that the one may stand still and provide additional drying for the harvested crop while the other is being filled. In this manner, the harvesting, drying and storing operations can still remain continuous despite adverse weather conditions.

One of the problems which we have overcome with respect to portable grain dryers is that most such dryers have not had a sufficient horsepower on the blower to dry the harvested crop sufficiently rapidly in order to perform a satisfactory job. We have overcome this difficulty by connecting the blower fan directly to the power-take-off of the tractor so that we have ample power to drive the blower at an unusually high rate of speed. As a result of this more rapid drying under most conditions one of our units can dry the harvested crop as rapidly as it is harvested.

Thus it can be seen that we have provided a portable grain dryer which is commercially feasible and practical in operation. It can be manufactured relatively cheaply and on a scale and of a size such that it will perform the desired job for the average farmer in less time and at a reduced cost relative to what would be involved if he were to harvest his crop and then transport it to a commercial drying place for the drying operation. One of the disadvantages of the latter method is that when there are adverse weather conditions in the field, commercial dryers are so over-worked that it is often times impossible for the farmer to find a commercial dryer to dry his crop before it has reached the state of spoilage.

It will, of course, be understood that various changes may be made in the form, details, arrangement and proportions of the parts without departing from the scope of our invention.

What is claimed is:

1. A self-contained portable grain dryer comprising, a box adapted to be mounted on a wheeled frame for movement therewith and including a bottom wall, an end wall and a pair of side walls, a perforated false bottom in said box spaced vertically above said bottom wall of said box and being connected to said walls to form therewith a heating chamber, an inwardly directed fan mounted in the portions of one of said walls defining said heating chamber for rotation about an axis extending at an angle to said wall, means for connecting said fan in driven relation with a source of rotatable power, a blast type burner carried by said box and extending downwardly into said heating chamber, a substantially closed furnace mounted within said heating chamber, said burner discharging into said furnace, a conduit extending from the interior of said furnace to the intake side of said fan and conveying the products of combustion from said furnace to said fan and discharging the same therebehind, an air scoop positioned directly in front of said fan and receiving forced air therefrom, and means connecting said air scoop with the interior of said burner to deliver air thereinto to support the combustion of said oil burner.

2. A self-contained portable grain dryer comprising a container adapted to be mounted on a wheeled frame for movement therewith, said container including an imperforate bottom wall, a pair of side walls and an end wall, a perforated false bottom extending across a major portion of the interior of said container and spaced vertically above said bottom wall and being connected to said walls to form therewith a heating chamber within said container, a furnace mounted within said heating chamber, a fan mounted within the portions of one of said walls defining said heating chamber for rotation about an axis extending normally thereto and having an air intake and discharge side and functioning to draw both hot and cool air from the outside of said container and to drive the same into said heating chamber and across said furnace and beneath said perforated false bottom and upwardly through the latter to accomplish the drying operation, an oil burner mounted on said container and being connected to said furnace and discharging its products of combustion thereinto, conduit means extending from said furnace to a position adjacent the intake side of said fan and delivering the products of combustion from the interior of said furnace into the intake of said fan, means for connecting said fan to a source of rotatable power, and an air chute disposed adjacent the discharge of said fan in position to receive air thereinto, said air chute being connected with the interior of said burner and conducting oxygen-laden air thereinto to support the combustion of said burner.

3. A self-contained portable grain dryer comprising a box adapted to be mounted on a wheeled frame for movement therewith, said box including an imperforate bottom wall, a pair of imperforate side walls and a pair of end walls, a perforated false bottom extending horizontally across the major portion of the interior of said container and spaced vertically above said bottom wall and being joined with said walls to form therewith a heating chamber extending below said false bottom, said false bottom being adapted to receive the material to be dried upon its upper surface and support the same during the drying operation, a furnace mounted within said heating chamber, a burner connected with said furnace and discharging fuel for combustion into the interior of said furnace, means for conducting the products of combustion from the interior of said furnace to a point outside said box and for discharging the same, means for conducting oxygen-laden air into the interior of said furnace in order to support such combustion, and rotary blower mechanism adapted to be connected to a source of rotary power and having an intake side positioned adjacent the discharge of said combustion products, said blower mechanism being connected with said heating chamber to permit the same when rotated to force a well mixed supply of hot products of combustion and air across the exterior of said furnace and upwardly through the perforations of said false bottom to efficiently dry the material supported by the upper surface thereof, one of said walls having an opening formed therein bringing the interior of said heating chamber into communication with the exterior of the container, said rotary blower mechanism being mounted adjacent said opening and in position relative to the discharge of said conduit so that the products of combustion will be released immediately behind said blower mechanism and be drawn into the interior of said heating chamber simultaneously with a supply of relatively cool air and mixed thereby and driven forcefully into the interior of said heating chamber, across said furnace and upwardly through said false bottom to effectively dry such materials.

4. A self-contained portable grain dryer comprising a box adapted to be mounted on a wheeled frame for movement therewith, said box including an imperforate bottom wall, a pair of imperforate side walls and a pair of end walls, a perforated false bottom extending horizontally across the major portion of the interior of said container and spaced vertically above said bottom wall and being joined with said walls to form therewith a heating chamber extending below said false bottom, said false bottom being adapted to receive the material to be dried upon its upper surface and support the same during the drying operation, a furnace mounted within said heating chamber, a burner connected with said furnace and discharging fuel for combustion into the interior of said furnace, means for conducting the products of combustion from the interior of said furnace to a point outside said box and for discharging the same, means for conducting oxygen-laden air into the interior of said furnace in order to support such combustion, and rotary blower mechanism adapted to be connected to a source of rotary power and having an intake side positioned adjacent the discharge of said combustion products, said blower mechanism being connected with said heating chamber to permit the same when rotated to force a well mixed supply of hot products of combustion and air across the exterior of said furnace and upwardly through the perforations of said false bottom to efficiently dry the material supported by the upper surface thereof, said means for bringing oxygen-laden air into the interior of said furnace including an air scoop positioned directly ahead of said rotary blower mechanism to receive warmed air therefrom, and a conduit connected to said scoop and said burner and conveying such warmed air to said burner to support the combustion.

5. A self-contained portable grain dryer comprising a box adapted to be mounted on a wheeled frame for movement therewith when the latter is drawn by a tractor having a power take-off, said box including an imperforate bottom wall, a pair of imperforate side walls and a pair of end walls, a perforated false bottom extending across the major portion of the interior of said box and being spaced vertically above said bottom wall and being connected with said walls to form therewith a heating chamber, a substantially closed furnace mounted within said box and within said heating chamber, one of said walls having an opening formed therein, a rotary fan mounted for rotation adjacent said opening for rotation about an axis normal to said wall, said fan functioning when rotated to draw air from the exterior of said box, and force the same into the interior thereof, mechanism for drivably connecting said fan with the power take-off of such a tractor, a pair of blast-type oil burners mounted on said container and being connected to said furnace to discharge the products of combustion thereinto, conduit means extending from said furnace to a point outside said box and discharging the products of combustion from the interior of said furnace at a point directly behind said blower, an air scoop positioned immediately ahead of said fan and receiving air therefrom, a pair of conduits extending from said scoop into each of said burners to convey warmed oxygen-laden air thereinto in order to support the combustion of the fuel oil, each of said conduits also having outlets leading into the interior of said heating chamber, and damper means within said conduits for directing the flow of air therethrough through said outlets and into the interior of said heating chamber when so desired.

6. In a self-contained portable dryer, the combination of a tractor, an ambulant frame connected to the rear of the tractor and being drawn thereby, a container mounted on said frame for movement therewith, said container including an imperforate bottom wall, a pair of imperforate side walls and a pair of end walls, a perforated false bottom extending across the major portion of the interior of said container and being spaced vertically above said bottom wall and being adapted to receive the material to be dried upon the upper surface thereof and to support the same during the drying operation, said false bottom being connected with said walls to form a heating chamber therewith extending below said false bottom, a substantially closed furnace mounted within said chamber, one of said container walls having an opening formed therein, a fan mounted for rotation within said opening and drawing air from the exterior of said container and forcing the same into the interior of said heating chamber, means connecting said fan with the power-take-off of said tractor for rotation thereby, a blast-type oil burner mounted on said container and beng connected with said furnace to permit the combustion gases therefrom to be discharged into said furnace, a conduit connected to said furnace and extending outwardly therefrom to the exterior of said container, said conduit having a discharge end adjacent the intake side of said fan and discharging the products of combustion from said furnace into the path of air moving into said fan, said fan engaging said products of combustion and some cool air from the exterior of said container and mixing the same thoroughly and forcing the same inwardly into said heating chamber and across said furnace and upwardly through said false bottom and through the material supported thereby to effectively dry the same, and means for providing oxygen-laden air to the interior of said burner to facilitate the combustion of the fuel of said burner.

7. A portable grain drier comprising, a body adapted to be mounted on a wheeled frame and including opposite end walls, side walls and a bottom wall, said body also having a perforate grain-suporting plate disposed between said end walls and side walls and in spaced relation to said bottom wall to define a heating chamber, one of said walls having an opening therein, a rotatable fan mounted on said body for directing air inwardly through said opening, a furnace disposed within said heating chamber and having a discharge conduit extending outwardly of said body terminating adjacent the intake of said fan, and there being an air intake conduit extending from the furnace and terminating within said heating chamber adjacent the discharge side of said fan.

8. A portable grain drier comprising, a body adapted to be mounted on a wheeled frame and including wall means forming an enclosure, a bottom wall for the enclosure, and a perforate grain-supporting plate disposed in spaced relation above the bottom wall and contacting said wall means to define therebeneath a heating chamber, said wall means having an opening therein, a rotatable fan mounted in said body for directing air inwardly through said opening, a furnace disposed within the heating chamber adjacent said opening, said furnace having a discharge conduit extending therefrom outwardly of the body and terminating adjacent one portion of the intake of said fan, and an air intake conduit extending from the furnace and terminating within said heating chamber adjacent the discharge side of the fan at a portion thereof spaced laterally from said one portion adjacent which said discharge conduit terminates.

9. A portable grain drier comprising a body adapted to be mounted on a wheeled frame and including opposite end walls, spaced side walls and a bottom wall, one of said end walls having an opening therein, a perforate false bottom extending from the other end wall in spaced relation above said bottom wall and terminating in spaced relation to said one end wall, an imperforate plate extending from the terminus of said false bottom and sloping upwardly therefrom for connection with said one end wall, said false bottom and said imperforate plate contacting the opposed surfaces of said side walls to define a heating chamber therebelow, a rotatable fan mounted within the opening in said one end wall and having its axis of rotation disposed substantially in alignment with the plane containing said false bottom, an elongate furnace disposed transversely within said heating chamber directly below said imperforate plate in spaced relation both with the imperforate plate and the bottom wall, a baffle on said bottom wall and extending therefrom generally toward the juncture of said false bottom and said imperforate plate, a burner mounted on said furnace and having discharge thereinto, and a discharge conduit extending from said furnace outwardly of said body and terminating adjacent the intake of said fan.

10. A portable grain drier comprising a body adapted to be mounted on a wheeled frame and including opposite end walls, spaced side walls and a bottom wall, one of said end walls having an opening therein, a perforate false bottom extending from the other end wall in spaced relation above said bottom wall and terminating in spaced relation to said one end wall, an imperforate plate extending from the terminus of said false bottom and sloping upwardly therefrom for connection with said one end wall, said false bottom and said imperforate plate contacting the opposed surfaces of said side walls to define a heating chamber therebelow, a rotatable fan mounted within the opening in said one end wall and having its axis of rotation disposed substantially in alignment with the plane containing said false bottom, an elongate furnace disposed transversely within said heating chamber directly below said imperforate plate in spaced relation both with the imperforate plate and the bottom wall, a baffle on said bottom wall and extending therefrom generally toward the juncture of said false bottom and said imperforate plate, a burner discharging into said furnace and including a tubular housing sloping upwardly therefrom behind said fan, said housing having an air intake opening directly behind one portion of said fan and a discharge conduit extending from said furnace outwardly of said body and terminating adjacent the intake of said fan.

11. In the grain drier as defined in claim 10 wherein the air intake opening for said burner and the terminus of said discharge conduit are disposed adjacent spaced portions of the fan opening.

References Cited in the file of this patent
UNITED STATES PATENTS

| | | |
|---|---|---|
| 2,035,716 | Peek | Mar. 31, 1936 |
| 2,356,950 | Root | Aug. 29, 1944 |
| 2,442,344 | Curtis | June 1, 1948 |
| 2,443,259 | Martin | June 15, 1948 |
| 2,532,530 | Andersen et al. | Dec. 5, 1950 |
| 2,539,153 | Muehleisen | Jan. 23, 1951 |
| 2,613,452 | Andersen et al. | Oct. 14, 1952 |
| 2,641,326 | Carlson | June 9, 1953 |